March 10, 1942.     C. E. WUENSCH     2,276,075
DRILLING FLUID
Filed Oct. 14, 1939
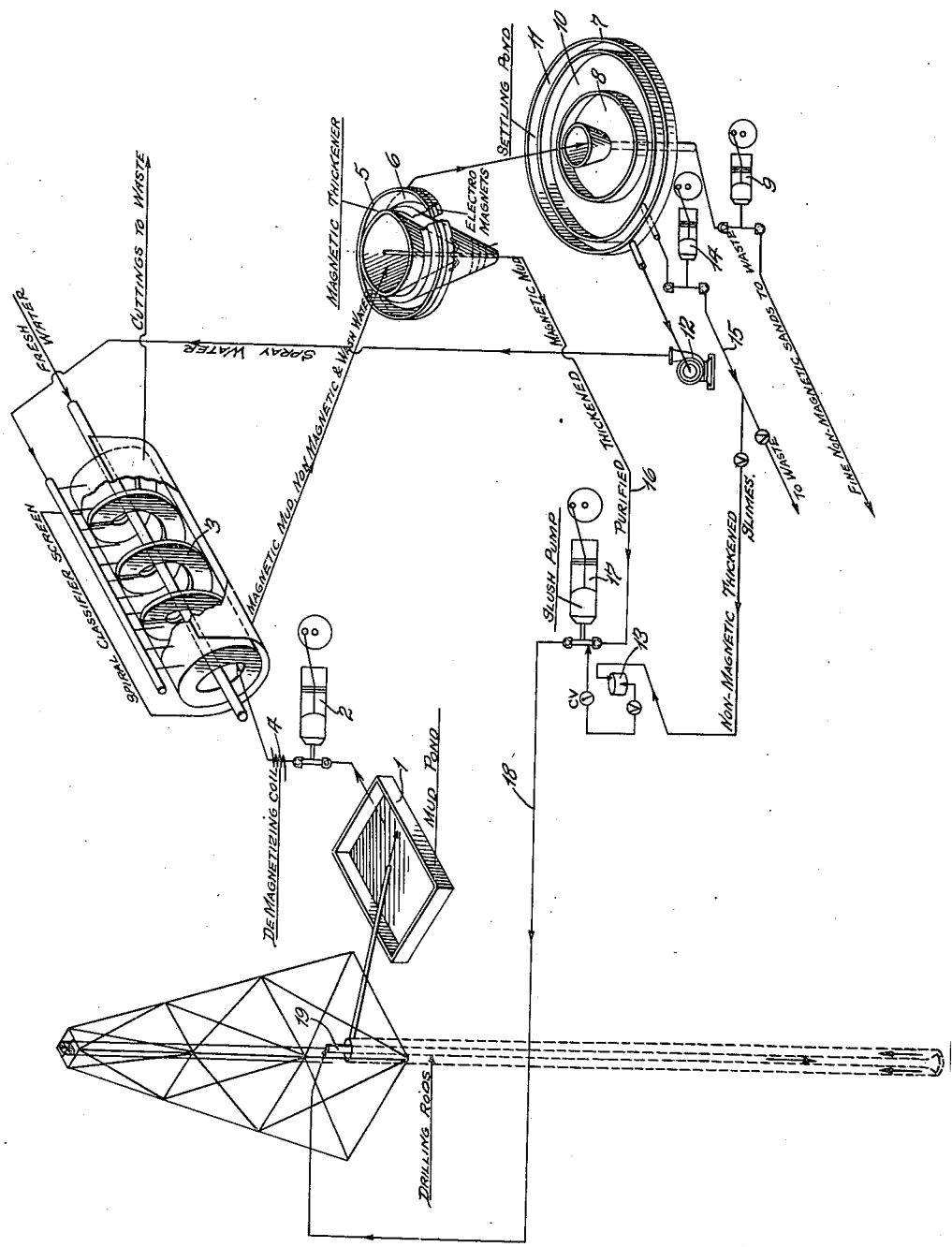
Inventor
Charles Erb Wuensch
by John H. Cassidy
His Attorney Patented Mar. 10, 1942

2,276,075

UNITED STATES PATENT OFFICE 2,276,075

DRILLING FLUID

Charles Erb Wuensch, Pittsburg, Kans.

Application October 14, 1939, Serial No. 299,438

10 Claims. (Cl. 252—8.5)

This invention relates to drilling fluids for wells. The principal use of such fluids is with rotary drills in drilling oil and gas wells, in which the fluid is pumped through the drill stem to the bit at the bottom of the hole and upwardly inside the well and around the drill stem to the top of the ground. The principal functions of the fluid are to carry the cuttings from the bit to the top of the well and to hold them in suspension when circulation is interrupted.

To best perform these principal functions and other ancillary functions the fluid must be of proper density and viscosity. To produce such a fluid the slimes from a well, or at least convenient clays, are usually used in part as a weighting material to give a fluid of greater specific gravity than water. Often, however, as is well known, heavier materials must be added to give a satisfactory specific gravity. In actual practice non-magnetic iron oxide and barytes are the weighting materials which have been used. Bentonite and other substances may be added when needed to affect the characteristics of the drilling fluid and more particularly the thixotropic property. Considerable of the weighting materials, such as iron oxide and barytes, are wasted because of the impossibility of purifying the fluid as it becomes contaminated with the slimes from the well, and they require constant testing and treatment to maintain them in suitable condition.

An object of this invention is to provide a weighting material for drilling fluids for wells which will be amenable to means for separation from the used fluids so that the drilling fluid may be kept at a standard of specific gravity, viscosity and thixotropy without wasting the weighting material by a simpler technique than is required with non-magnetic materials.

Another object of the invention is to provide a drilling fluid which will have a maximum efficiency at a particular specific gravity.

A further object of the invention is to provide a drilling fluid which will have improved characteristics and which will be apparent from the following detail description.

The accompanying drawing is a diagram illustrating a system employing a fluid and the process embodying this invention.

A characteristic feature of this invention is the use of comminuted magnetic solids as a part of a drilling fluid and the separation of those solids from the contaminated fluids by flocculation and retention under the influence of a magnetic field.

The particular magnetic substance used may be selected from a wide range of materials. Selection will depend upon economic factors and magnetic and physical properties desired or required. Cheapness, of course, is an important consideration in the selection. The magnetic properties including permeability, remanence and coercitivity are factors. These latter properties can be modified to produce specific desirable properties, by controlling the roasting, annealing and quenching. Other physical properties to be considered are specific gravity, grain size, and hardness. Since a purpose in the addition of such material is an increase in specific gravity of the fluid, the relative weight of the material is one of the first considerations. And the material should not be so hard or abrasive as to cause excessive wear on the drill parts.

Among the materials most readily available at a reasonable price and having satisfactory magnetic and physical properties are magnetic iron oxides. These include the mineral magnetite, and artificial magnetite prepared by roasting non-magnetic iron oxides under reducing conditions and other means known in the prior art. For reasons which appear later in this description, chemically precipitated ferro-ferric is preferred as a part of the material used. Many minerals of varying cost could be used as, for example, franklinite, pyrrhotite, roasted bornite, chalcopyrite, lollingite, arsenopyrite, wolframite and numerous ferro alloys (the hardness of many of the latter would be objectionable) and powdered iron (either attrition from ball mills or produced by pyro reduction or electrolytically) with some auxiliary treatment to prevent rusting, etc. Some of these would make "muds" with a density of over 3.0. Of scientific interest or for some special emergency problem, where cost might be of secondary importance, densities of 4 to 5 could be obtained with Huesler's alloys, and 5 to 5.5 could be obtained with iron amalgams.

The major portion, at least, of the weighting material may be of a size such as is now employed with barytes and iron oxide, —325 mesh (44 microns). Preferably a mixture of two materials is used, one ground to the required fineness, but relatively coarse as compared to the other constituent, which may be chemically precipitated ferro-ferric oxide, or other ferrites, having a grain size of about .5 micron.

In preparing suspension fluids there must be a sufficient percentage of quasi-colloidal particles (—200 mesh) to support contaminating "cuttings" of coarser size and to make a suspension which will not settle too rapidly. The method of grinding is also important. For example, dry grinding in a disc pulverizer produces lathe shaped particles which are predominantly crystalline and do not make a "smooth" suspension. Grinding in ball mills using a large percentage of small balls in general gives the best results. The specific gravity of a given suspension fluid varies with the grain size and ratio of grain sizes. In general, if all the material is ground to −200 mesh the resulting suspension would be from 0.5 to 1.0 to a point less in specific gravity for a given viscosity than if a blending of grain sizes with coarser material were used.

The volumetric ratio of water to solids must, in general, be greater than 1:1 for proper fluidity. This varies considerably with the pH and the grain size ratios for a given substance.

It has been found that the use of a minor portion of relatively fine material is desirable. This material is preferably chemically precipitated ferro-ferric oxides which, as stated above, have a grain size of about .5 microns although continued grinding might also produce such fine grain sizes. By way of explanation it may be said that ground magnetic iron oxide has a dry bulk specific gravity of 4.00 and produces with water a pulp of maximum pumping viscosity having a specific gravity of 2.25. Chemically precipitated ferro-ferric oxides have a dry pulp specific gravity of 1.5 and produces a pulp of maximum pumping viscosity with a specific gravity of 1.5. But a blend of the two using one part by volume of the chemically precipitated iron oxide and seven parts of the ground oxide produces a pulp having a specific gravity at maximum pumping viscosity of substantially the same as the ground oxide, that is 2.25.

Preferably the magnetic particles are magnetized before introduction into the well. The use of magnetized particles results in important functions disclosed in the following discussion. Magnetized particles of all grain sizes settle more rapidly than unmagnetized or demagnetized materials due to the agglomeration of the grains into flocs. Although the magnetized particles settle more rapidly than the unmagnetized or demagnetized particles they do not pack as tightly as unmagnetized particles. Apparently the finer sized grains are oriented into minute plate-like flocs, along the lines of the magnetic field so as to have a structure similar to that which has been advanced to account for the "geling" properties of bentonite. Inherent coercitivity and remanence account for the ability of these particles to retain this important property. These two properties conjointly make the magnetic suspension possess quasi-thixotropic properties without the use of gels and which are but slightly affected by variations in pH. Ground magnetite or artifically "roasted" magnetic oxides do not possess the quasi-thixotropic properties unless blended with chemically precipitated ferro-ferric oxide. This is probably due to a combination of the fine grain size and resultant greatly increased coercitivity.

By quasi-thixotropic is meant a property analogous to that of gels which permits the material even when settled to again become fluid upon agitation. Or by example, if pumping is stopped the cuttings will remain in suspension and will not settle out and while there will be a settling of the material it will not pack around the drill and stem but will again become fluid when pumping is resumed.

Drilling fluids prepared with these magnetic materials are not "gas cut" to any appreciable degree except when mixed with oil. Even then it is not excessive and in a magnetic separator, where the magnetic material is recovered and freed from the slimes (non-magnetic material) the emulsions are destroyed. The magnetic slimes recovered may be "thickened" at once in a magnetic separator to approximately a maximum density, as if allowed to settle for several hours regardless of their contamination with colloidal material, salts in solution, pH or the dilution.

The following description of the process taken in connection with the accompanying diagram or flow sheet will assist in understanding and practicing the invention. Drilling mud loaded with cuttings from the well flows into a mud pond 1 whence a pump 2 elevates it to a spiral classification screen 3. As the fluid flows to the screen it passes under the influence of a demagnetizing coil 4 to break up the flocs or agglomerated masses of magnetized material. In the spiral classifier screen the plus +80 mesh cuttings are removed absolutely free of all slimes (magnetic and non-magnetic). The minus ±80 mesh materials and washing spray water flow to a magnetic thickener 5 where the magnetic material is flocculated, retained and separated from the non-magnetic slimes. The purified magnetic material is thereby recovered for recirculation and the non-magnetic material and wash water are eliminated over the electromagnetic overflow launder 6. This goes to a double settling pond 7 where fine crystalline particles settle in a smaller inner pond 8, whence they are withdrawn by a pump 9 and wasted.

The fine colloidal and semi-colloidal particles overflow the wall of the inner pond and settle in the larger pond 10.

Slightly turbid water overflowing into a peripheral launder 11 is recirculated by a centrifugal pump 12 and is used for spray water for the spiral classifier screen 3. A portion of the settled thickened slimes from the pond 10 may be used and mixed with the purified magnetic materials together with gels or other make up materials in a tank or mixer 13. A pump 14 withdraws the slimes from the pond 10 passing them through a line 15 either to waste or to the "make-up" tank 13. The magnetic material is conducted from the bottom of a cone of the magnetic thickener 5 through a line 16; the material having been magnetized when flocculated and retained at the electro-magnetic launder 6. A slush pump 17 withdraws the purified thickened magnetic material through the line 16 together with other materials from the tank 13 and forces it through a line 18 to a drill stem 19, whence it passes through the drill stem to the drill at the bottom of the hole and upwardly between the wall of the hole and the drill stem to the pond 1 to complete the cycle.

Suitable valves and by-passes may be placed in the circuit to facilitate taking samples, adding make up materials, etc. Automatic control density devices may be used. It is contemplated of course that necessary and convenient storage and surge tanks be provided (but not shown). It may be understood that various changes may be made in details, and it is contemplated that these will be made to take care of local conditions, within the scope of the appended claims, without departing from the spirit of this invention. Parts of the invention may be used without the whole, and various additions and improvements may be made or added.

While in the diagram and in the description certain specific apparatus is indicated, such as diaphragm piston pumps, spiral classification screen, a cone magnetic thickener, and double settling pond, and these are preferred apparatus, it may be understood that other apparatus to perform these functions are available and may be used.

The medium herein disclosed for drilling muds may be used for other purposes, such as mineral separation and pipe line transportation of comminuted solids. Its principal merit is the simplicity by which it may be recovered and purified from contaminating mineral slimes. In such cases, however, the magnetic materials will be varied to suit the particular purpose. Generally for separating ores larger particles will be used, at least in part, particularly to secure higher specific gravity and because the abrasive characteristics of such larger particles will not be so objectionable. Furthermore, for these uses heavier types of magnetic materials may be used. These may be such as comminuted metallic iron, preferably treated to reduce or retard rusting or oxidation, and this iron may be either substantially pure iron or ferro alloys, or other magnetic materials such as Heusler's alloy speisses, mattes, ferrites or even iron amalgams.

I claim:

1. The method of utilizing drilling muds comprising mixing comminuted magnetic solids with water, conducting the mixtures through a well drilling system to bring cuttings to the top of the well, and recovering the magnetic solids by flocculation and retention through the influence of a magnetic field.

2. The method of utilizing drilling muds comprising mixing comminuted magnetic solids with native slimes, conducting the mixture through a well drilling system to bring cuttings to the top of the well, removing coarse cuttings, and recovering magnetic solids in a thickened condition by flocculation and retention through the influence of a magnetic field.

3. In the are of drilling wells, the process comprising introducing into the well a mud laden fluid, controlling the density of the fluid by the addition of comminuted magnetic solids, and recovering the magnetic solids by flocculation and retention through the influence of a magnetic field.

4. In the art of drilling wells, the process comprising introducing into the well a mud laden fluid, controlling the density of the fluid by the addition of magnetized particles of magnetic solids, and recovering the magnetic solids by flocculation and retention through the influence of a magnetic field.

5. In the art of drilling wells, the process comprising introducing into the well a mud laden fluid, controlling the density of the fluid by the addition of magnetized particles of magnetic solids including chemically precipitated iron oxide, and recovering the magnetic solids by flocculation and retention through the influence of a magnetic field.

6. The method of utilizing drilling muds comprising mixing magnetized comminuted solids with water and earthy material, conducting the mixture through a well drilling system to bring cuttings to the top of the well, demagnetizing the laden mud, screening the mud to remove coarse cuttings, recovering the magnetic solids by flocculation and retention through the influence of a magnetic field, and magnetizing the recovered solids for reintroduction into the well.

7. The method of utilizing drilling muds, comprising mixing comminuted magnetic solids with native slimes, conducting the mixture through a well drilling system to bring cuttings to the top of the well, removing coarse cuttings, recovering the magnetic solids by flocculation and retention through the influence of a magnetic field, and mixing the residual slimes with recovered magnetic solids to secure a fluid of predetermined specific gravity and viscosity for re-use.

8. The method of handling materials in a fluid of high specific gravity including preparing a buoyant medium of predetermined specific gravity by suspending in water a comminuted magnetic solid in sufficient quantity to increase the specific gravity of the medium substantially over that of water, introducing the materials into said buoyant medium, removing the materials from said medium after they had been handled, and after the buoyant medium has been contaminated recovering the comminuted magnetic solids therefrom by flocculation and retention through the influence of a magnetic field.

9. In the art of handling materials in a liquid buoyant medium of substantially higher specific gravity than water, controlling the density of said medium by addition of a comminuted magnetic solid, introducing the materials into the medium, removing the materials from said medium after they have been handled, and after the buoyant medium has been contaminated, recovering the comminuted magnetic solids therefrom by flocculation and retention through the influence of a magnetic field.

10. In the art of handling materials in a liquid buoyant medium of substantially higher specific gravity than water, controlling the density of said medium by addition of a comminuted magnetic solid, introducing the materials into the medium, removing the materials from said medium after they have been handled, and after the buoyant medium has been contaminated, passing it through a screen of sufficiently large mesh to pass the comminuted magnetic solids, and then recovering the comminuted magnetic solids by flocculation and retention through the influence of a magnetic field.

CHARLES ERB WUENSCH.